United States Patent

Bryne

Patent Number: 5,176,597
Date of Patent: Jan. 5, 1993

[54] RACING SPEED TRAINING AND THERAPY APPARATUS AND METHOD

[76] Inventor: Richard M. Bryne, 2172 Pine St., San Diego, Calif. 92103

[21] Appl. No.: 763,558

[22] Filed: Sep. 23, 1991

[51] Int. Cl.⁵ ............................................... A63B 71/00
[52] U.S. Cl. ............................................ 482/74; 482/54
[58] Field of Search .................... 482/74, 54, 14, 51, 482/66, 67, 68

[56] References Cited

U.S. PATENT DOCUMENTS

| | | | |
|---|---|---|---|
| 4,334,677 | 6/1982 | Tata | 482/74 |
| 4,861,021 | 8/1989 | Edwards et al. | 482/54 |
| 5,000,440 | 3/1991 | Lynch | 482/54 |

Primary Examiner—Stephen R. Crow
Attorney, Agent, or Firm—Brown, Martin, Haller & McClain

[57] ABSTRACT

The racing speed training method uses a support device attached to a belt, harness or seat which encircles or supports some portion of the runner's body. The support device can be freestanding or can be attached to a propulsion means for road or track training. The supports are adjustable and are releasably attached by clips or the like to a belt or harness around the runner's body. The runner will be partially suspended from the device such that when his or her feet hit the ground, less of the runner's weight will impact upon the ground. The amount of lift can be varied by shortening or lengthening the supports, by adjusting the tension of the support, or raising or lowering the frame so that a runner can start training at an artificially-induced lighter impact weight, find his or her optimum form at an increased speed, and then gradually apply the improved speed and form to carry the runner's full weight.

15 Claims, 2 Drawing Sheets

RACING SPEED TRAINING AND THERAPY APPARATUS AND METHOD

BACKGROUND OF THE INVENTION

Training for running races, whether humans, horses or dogs, and for other racing sports such as speed skating and cross-country skiing, involves building both muscle strength and endurance. Using the example of a human, a person who wishes to run an event such as the 10,000 meter (6.2 miles) would train by running distances to increase endurance and strength. That person may also use weight training to further build leg strength. These exercises, however, will not improve the runner's speed to its highest level. In general, the runner who wants to increase his or her power (power=strength/time) does so preferably by both increasing strength and decreasing the time required to cover a given distance.

The only way to improve running speed is sprinting—running as fast as possible. The runner who is training for speed usually runs a series of sprints (repetitions or "reps") designed to train his or her muscles to react faster and become more coordinated, to progressively enable him or her to reach higher maximum speed and power. Generally, in order to achieve this, the runner needs to find his or her own best form and pace. Unfortunately, due to the impact of the runner's feet hitting the ground with a force many times that person's weight, it is extremely difficult to maintain maximum speed for any length of time, as needed to accomplish the goal. The joints are jarred and the leg muscles, especially the quadriceps, are required repeatedly to effectively lift an enormous weight, resulting in early exhaustion and, often, injury. Also, it can take on the order of 10 to 15 minutes to recover from one rep, so that an intense power workout consumes a great deal of time with a relatively small amount of actual running. Thus, "teaching" the muscles to react faster is a long, frustrating and sometimes painful task that prevents many runners from achieving their potential speed.

Devices are available which will allow a runner to float or be suspended in a swimming pool while moving the legs in a running motion. Similar devices are available for training race horses where the horse is tethered so that it is centered in a pool where it swims in place. Each of these devices provides a training means by which the impact of running is avoided. It is difficult, however, to achieve actual running form when there is no ground from which to push off. Also, the water provides resistance which builds muscle strength but prevents rapid motion for speed training.

In spite of its disadvantages, "pool jogging" provides a means by which an injured runner can begin to train without the risk of re-injury due to the stress and shock of pounding the ground. By lightening the runner's relative weight, he or she can recuperate by gradually reconditioning the leg muscles around the injury which may have atrophied during non-use. It would be desirable to use a method similar to pool jogging to provide a means for controllably lightening a racer's weight in a similar manner while still permitting the racer to attain correct running or racing form.

SUMMARY OF THE INVENTION

It is an advantage of the present invention to provide a means by which a runner's or other racer's weight can be controllably lightened, permitting training of the muscles to become more coordinated and react faster without the stress and shock of sprinting.

It is another advantage of the present invention to provide a method and apparatus which relieves the resistance experienced in ordinary running to prevent early exhaustion or injury during training.

A further advantage of the present invention is to provide a method and apparatus to assist in recovery from injuries to permit strengthening of the muscles with minimal stress and shock.

Still another advantage of the present invention is to provide an apparatus that can be used for either road or stationary running training.

In an exemplary embodiment, the racing speed training apparatus comprises a frame from which is suspended or from which extend a plurality of supports attached to a belt or harness which encircles some portion of the racer's body. (For purposes of discussion, a runner will be used, but the apparatus is equally applicable to other self-propelled racing sports.) The frame can be freestanding or can be attached to a vehicle for road training. The frame forms a bridge-like structure, the horizontal portion of which is preferably at least waist high or higher on the runner. The supports can be elasticized cords, nylon webbing or springs, for example. The supports are adjustable in tension and are releasably attached by clips or the like to a belt or harness around the runner's body. The belt is sufficiently pliable and elastic so that it does not inhibit the runner's breathing or movements, but not so elastic as to permit the runner's weight to completely overcome the upward forces of the supports. The support straps are attached to the belt at locations toward the center of the runner's body so that the straps do not interfere with normal arm swing. The runner will be essentially partially suspended from the frame such that when his or her feet hit the running surface, less of the runner's weight will impact upon the running surface. The amount of lift can be varied by adjusting the supports, or raising or lowering the frame so that a runner can start training at a lighter weight, find his or her optimum form and improve speed, then gradually apply the improved speed and form to carry more weight. By this technique the runner can use "artificial speed" to establish his or her optimum rhythm and stride to mentally and physically prepare for attaining that same rhythm and stride in a race situation.

The frame can be attached to a car or other propulsion means, such as a motorized rail, that the runner can run alongside for outdoor or track training. This would particularly be applicable to elite runners for a coached workout.

For indoor and/or stationary use, the frame is constructed to span a treadmill or similar stationary running device to permit the runner to run in place at high speeds with reduced impact. This allows a runner who lives in areas where weather conditions limit training to continue speed training year round, if desired, in spite of inclement weather. Also, applying the technique to horses, treadmills are used to analyze the horse's running form. By supporting a portion of the horse's weight, it is easier to start the running action with minimal stress on the animal. The support is especially useful if the horse has an injury which would .be visible in running form without applying the horse's full weight to possibly further injure the horse.

In an alternate embodiment, a frame which surrounds the runner has wheels at its bottom to allow the runner to use the anti-gravity effect of the present invention without requiring a vehicle to which to attach the frame. This embodiment can be motorized to increase its speed.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1:
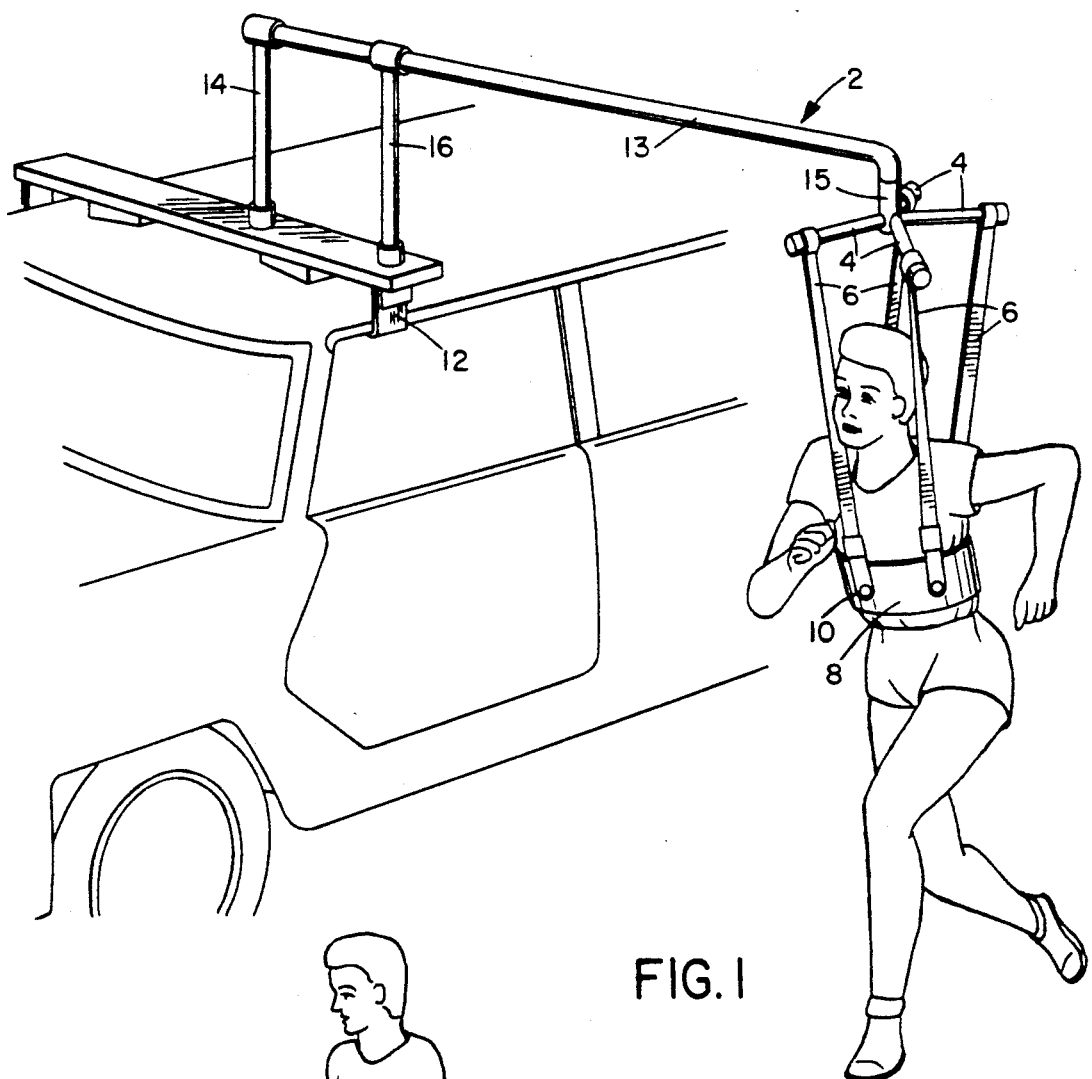
FIG. 1 is a perspective view of a runner using a first embodiment of the present invention.

As illustrated in FIG. 1, frame 2 is attached to a vehicle by bracket 12. The frame 2 extends out beyond the vehicle where it branches out to arms 4. Suspended from each arm 4 is a support strap 6 with a releasable clasp 10 on its lower end. Clasp 10 attaches to a ring 11 on belt which encircles the runner's body near his waist.

Frame 2 must have sufficient strength to bear the runner's weight. Therefore, bracket 12 must attach securely to the vehicle. Bracket 12 can have, for example, a telescoping structure to accommodate different car widths with a roof-mounted bracket. It may also be desirable to have two sets of bracket 12, one spaced forward of the other with the frame 2 attached to both brackets so that additional vertical support is provided.

In this embodiment, vertical legs 14 and 16 must be high enough to cause the frame 2 to be well above the runner's head so that there will be no risk of the runner's head hitting the frame 2. Generally, the frame 2 should be configured so that it does not interfere with the runner's normal motion. Legs 14 and 16 can be made telescoping so their height can be adjusted. Telescoping and locking can be achieved by a tube lock design or by hydraulics.

Horizontal extension 13 is of sufficient length to allow the runner to be completely clear of the vehicle, but short enough to maintain the upward force of the vertical supports at its farthest extension from the supports. A small amount of flex may be desirable as long as the frame is still high enough to lift the runner.

Connector 15 provides connection between horizontal extension 13 and the arm assembly from which the support straps 6 are suspended. Connector 15 must be short enough to maintain the arm assembly well above the runner's head.

The arm assembly in the exemplary embodiment is a spider with four arms 4, two arms extending forward and two arms extending backward from connector 15. Each arm 4 is of sufficient length to retain support straps 6 at a front-to-back spacing greater than the thickness, front to back, of the runner. The side-to-side width of the arms 4 should maintain each strap between the respective side of the runner's head and his or her outer shoulder so as not to obstruct the runner's vision and head movement and to avoid interference with proper arm swing. It should be noted that four arms are used as an example only and that any number of arms which provides the necessary support can be used.

The straps 6 are securely attached to their respective arms and may be adjustable in tension by way of buckles, slides or VELCRO, for example. At the ends of the straps 6 is a releasable spring locking clasp 10, or other similar fastener. Clasp attach to a corresponding loop or hook on belt 8. VELCRO may also be used with the loop portion on the belt 8 and the hook portion on the straps 6, or vice versa.

Figure 4:
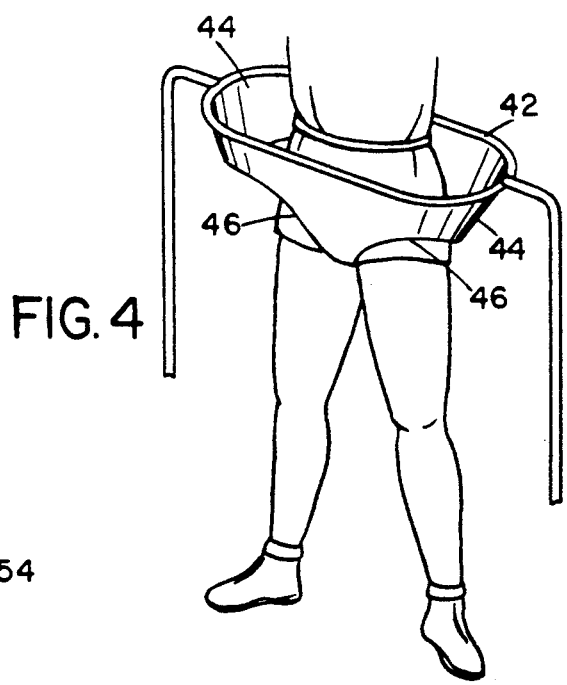
FIG. 4 is a perspective view of an alternate embodiment of a support means which may be used with any configuration of the invention.

The belt 8 should be of a pliable fabric which has sufficient elasticity to avoid constricting the runner's breathing but not so elastic as to stretch so that it absorbs all of the upward force without providing any lift to the runner. The device illustrated in FIG. 4 combines the belt with the means of support in a hoop-like structure 42 which has fabric 44 stretched across it. The runner places his or her legs through the openings 46 so that the fabric 44 acts somewhat like a sling to support the lower portion of the runner's torso. The fabric can be elasticized, such as LYCRA.

Figure 5:
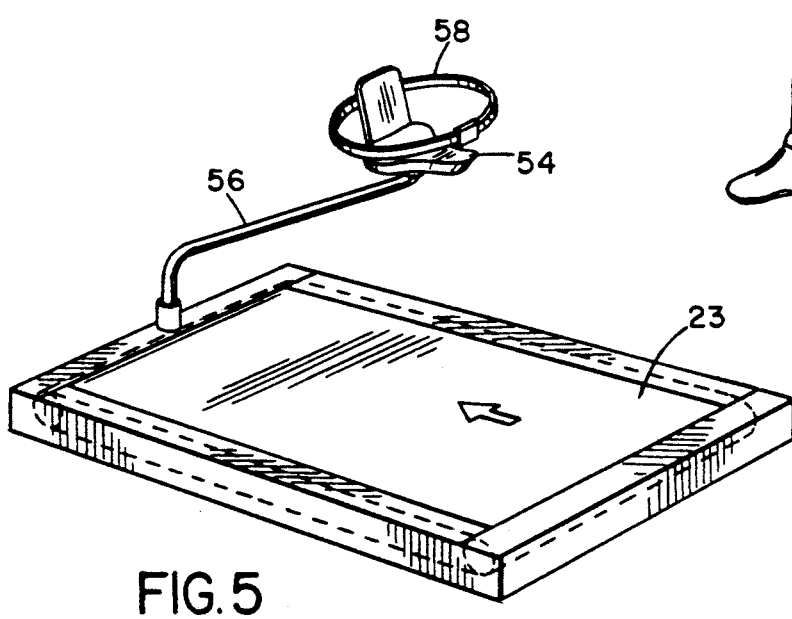
FIG. 5 is a perspective view of a second alternate embodiment of a support means.

In a second alternate embodiment of the support means illustrated in FIG. 5, a bicycle seat 54 is attached to a single heavy spring-like bar 56. The runner sits on the seat 54 which is sufficiently narrow, similar to that of a racing bicycle, to permit free movement of the legs. A belt 58 is provided to hold the runner in place while running. The bar is affixed to the frame of a treadmill 23, either at the base or at an elevation from, for example, a vertical extension from the base, from which a horizontal rod or boom can extend.

Exemplary materials for frame 2 are aluminum, stainless steel, fiberglass, polyvinylchloride and other high-strength polymers. The size of the tubing or bar will depend on the strength of the material used. The primary concern is that the material be strong enough to resist bending. The straps 6 can be elastic cord, springs, nylon webbing or similar fabric. The straps would preferably have at least a small amount of elasticity.

In a second embodiment of the invention for use with stationary training devices such as treadmills, a bridge-like frame 20 is made to span the treadmill. Vertical legs 24 are of sufficient length to maintain crossbar 22 well above the runner's shoulders. Legs 24 may be made telescoping to permit height adjustment. Crossbars 22 are separated enough to maintain the straps 26 within the space between the runner's head and his or her outer shoulder to permit full arm swing. The straps 26, belt or harness 28 and fastener 30 are as described in the first embodiment.

Use of the first embodiment shown in FIG. 1 is by attaching the frame 2 to some portion, usually the top, of a vehicle. The vehicle must be heavy enough to not be tipped by the runner's weight at the other end of the frame. Bracket 12 is similar to those used for bicycle and ski racks and will be installed in the same manner. Depending on the runner's height, the length of vertical legs 14 and 16 are adjusted if they are extendable. The runner will place the belt 8 or harness around his or her torso at a comfortable position. The clasps 10 are then attached to the corresponding fastener on the belt 8. The vehicle drives at a slow speed until it reaches the desired training speed. In addition to cars or trucks, the vehicle can be human powered, such as a bicycle, or tricycle, or a motorcycle. Propulsion can also be provided by attachment of the frame to a motorized rail structure which, for example, runs parallel to a track, in a manner similar to the rabbit in dog races. It is desirable to provide a release mechanism in the support means so the runner can quickly exit the device in the event of tripping or pulling a muscle, for example. Alternately, the support should be sufficient to prevent the runner from hitting the ground in case of tripping.

While the embodiments illustrated indicate the frame above the runner's head, the frame can be lower as long as it has supports extending from it toward the runner which will provide upward force when attached to the belt or harness worn by the runner so the runner's weight will be lightened. Stiff springs or resilient rods such as fiberglass, for example, can provide upward force on the belt when directed upward from the frame.

An anticipated training program would involve starting with the maximum support which would allow the runner to firmly contact the ground (enough to get the feel of pushing off and to attain full stride). The propulsion means goes somewhat faster than the runner normally runs, so the runner is forced to go faster, similar to running downhill. After a number of workouts, once the runner's muscles have developed the coordination required for faster response and optimum stride, the support would be decreased while still running the same speed. Once speed is improved, support may then be gradually decreased to finally permit the runner, who has found his or her optimum stride and best muscle response, to run at the enhanced speed unaided.

Figure 2:
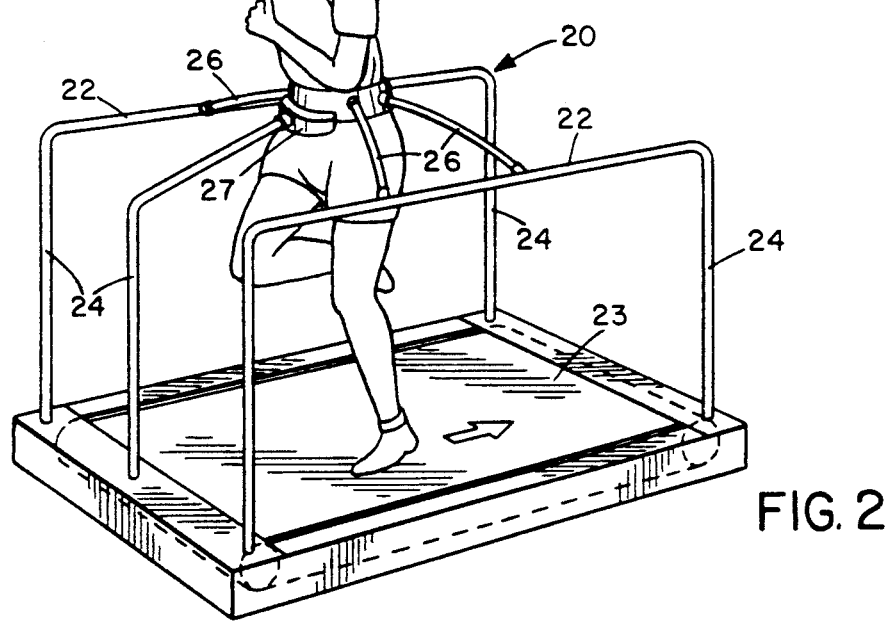
FIG. 2 is a perspective view of a second embodiment of the present invention for stationary use.

For stationary training a similar concept is used as for mobile training with speed adjusted on the treadmill. Here, the horizontal arms 22 of the frame are approximately waist high and springs 26 provide slightly upward force from the frame 20 to the belt 28 to provide lift for the runner. Frame 2 is attached by horizontal legs 24 to the treadmill 23. The treadmill 23, as illustrated in FIG. 2, can include a variable control such that the runner can increase speed by, for example, leaning against a control lever 27 or bar. FIG. 5 also illustrates an embodiment of the device as applied to use with a treadmill 23.

For use with racing animals, either the mobile or stationary system can be adapted to equipment of an appropriate size and speed. For example, a harness or sling can be placed around a horse's torso with the straps and frame spaced sufficiently to permit full extension without interfering with running form. A scaled-up treadmill can be used with the training apparatus for installation at racing stables to assist in speed training, strengthening and recuperation from injury.

Figure 3:
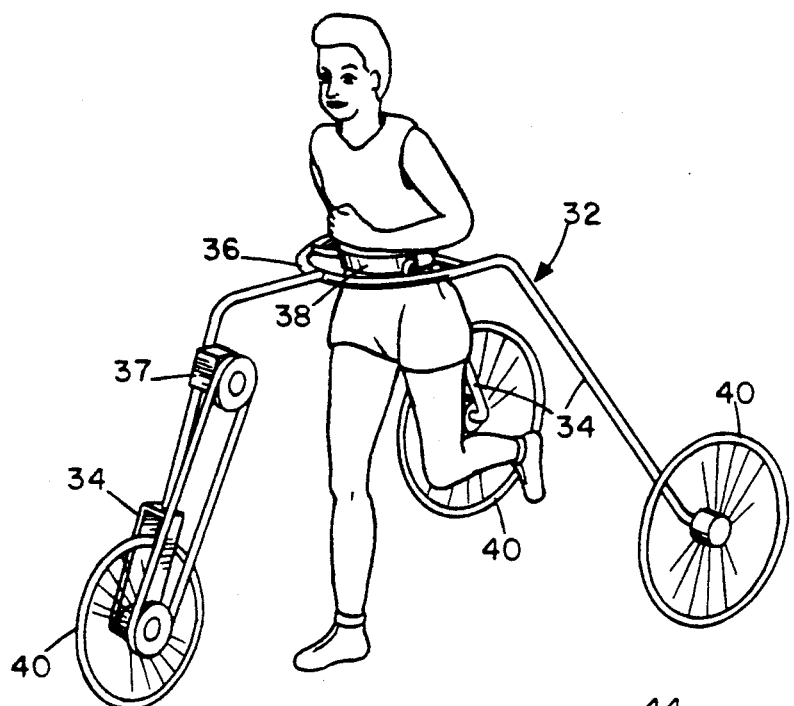
FIG. 3 is a perspective view of a third embodiment of the present invention.

A third embodiment shown in FIG. 3 permits the runner to do an open-road workout without requiring a driver for a vehicle to support the frame. The frame 32 encircles the runner approximately waist high. Supports 36 extend inward to attach to belt 38. Supports 36 will be rigid enough to provide upward force on belt 38, and may be made of rods of fiberglass or other strong resilient rubber, plastic or polymer, stiff springs, or metal, for example. In the configuration illustrated, supports 36 run across the frame opening and are attached at both front and back of the frame 32. The supports spanning the frame 2 are attached to the sides of the belt 38, and are flexible and resilient to avoid restricting the runner's movement. Vertical frame supports 34 may be telescoping to permit adjustment of the frame height.

Large diameter wheels 40 are attached to the vertical frame supports. Shock absorbers or springs may be included to permit a smoother run by allowing normal up-and-down motion while running. The third embodiment can also be equipped with a motor 37 to allow its speed to increase to provide "pull" on the runner to increase his or her speed, creating "artificial speed".

The apparatus of the present invention can be used for speed training for other racing sports such as speed skating, both ice- and roller-, and cross-country skiing.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A method of improving the power of a participant in a speed racing sport so that said participant's speed is increased, said method which comprises:
   assembling a frame having at least one horizontal arm;
   affixing said frame to a racing means so that a racing surface is provided wherein one of said frame and said racing surface moves with respect to the other;
   extending at least one support means for generally encircling the body of said participant so that said at least one support means exerts an upward force on said body;
   lifting said participant so that a portion of said participant's weight is supported by said support means; and
   causing said participant to race on said racing surface when said racing means is activated.

2. A method as in claim 1 wherein the step of affixing said frame to a racing means comprises affixing said frame to a propulsion means.

3. A method as in claim 1 wherein the step of affixing said frame to a racing means comprises spanning a stationary running machine with said frame.

4. A method as in claim 1 wherein the step of affixing said frame to a racing means comprises rotatably attaching a wheel at a lower end of each of a plurality of vertical means attached to said at least one horizontal arm.

5. A method as in claim 1 wherein the step of affixing said frame to a racing means comprises affixing said frame to a motorized track.

6. A method as in claim 1 wherein the step of extending at least one support means from said frame comprises suspending a plurality of elastic straps or cords from said frame.

7. A method as in claim 1 wherein the step of extending at least one support means from said frame comprises spanning a fabric across at least a portion of said frame where said portion of said frame is generally in the shape of a hoop, said fabric having a plurality of openings therein.

8. A method as in claim 1 wherein the step of extending at least one support means from said frame comprises attaching a bicycle seat to said frame.

9. A method as in claim 1 wherein the step of lifting said racer comprises varying said portion of said runner's weight supported by said support means.

10. A method as in claim 1 wherein said racer is a human.

11. A method as in claim 1 wherein said racer is a racing animal.

12. A method of assisting a runner or other participant in a racing sport in recuperation from injury which comprises:
  assembling a frame having at least one horizontal arm;
  affixing said frame to a running means so that a running surface is provided wherein one of said frame and said running surface moves with respect to the other;
  extending a support means for encircling the body of said runner so that said support means exerts an upward force on said body;
  lifting said runner so that a portion of said runner's weight is supported by said support means; and
  causing said runner to run on said running surface when said running means is activated.

13. A method as in claim 12 wherein the step of affixing said frame to a running means comprises affixing said frame to a vehicle.

14. A method as in claim 12 wherein the step of affixing said frame to a running means comprises attaching said frame to a stationary running machine.

15. A method as in claim 12 wherein the step of affixing said frame to a running means comprises rotatably attaching a wheel at a lower end of each of a plurality of vertical legs attached to said at least one horizontal arm.

* * * * *